Nov. 27, 1962 J. W. BASFORD 3,065,893
APPARATUS FOR APPLYING TENSION TO EXTRUSIONS
Filed Aug. 4, 1960 4 Sheets-Sheet 2

INVENTOR.
JAMES W. BASFORD
BY
Schmieding and Fultz
ATTORNEYS

Nov. 27, 1962  J. W. BASFORD  3,065,893
APPARATUS FOR APPLYING TENSION TO EXTRUSIONS
Filed Aug. 4, 1960  4 Sheets-Sheet 3

INVENTOR.
JAMES W. BASFORD
BY
Schmieding and Fultz
ATTORNEYS

Nov. 27, 1962 J. W. BASFORD 3,065,893
APPARATUS FOR APPLYING TENSION TO EXTRUSIONS
Filed Aug. 4, 1960 4 Sheets-Sheet 4

INVENTOR.
JAMES W. BASFORD
BY
Schmieding and Fultz
ATTORNEYS

United States Patent Office 3,065,893
Patented Nov. 27, 1962

3,065,893
APPARATUS FOR APPLYING TENSION
TO EXTRUSIONS
James W. Basford, Columbus, Ohio, assignor to The Plastex Company, Columbus, Ohio, a corporation of Ohio
Filed Aug. 4, 1960, Ser. No. 47,474
7 Claims. (Cl. 226—172)

This invention relates to apparatus for applying tension to extrusions such as plastic pipe, trim strips, and the like.

In general the apparatus of the present invention includes spaced endless conveyors disposed in confronting relationship for frictionally engaging opposite sides of an extrusion.

One of the endless conveyors is mounted on a stationary lower frame portion and the other of the endless conveyors on a second frame portion that is movable relative to said first frame portion. This permits variation in the distance between the confronting portions of the endless conveyors whereby extrusions of various diameters can be accommodated by the apparatus.

As one aspect of the present invention the two endless conveyors are provided with an interconnecting driving apparatus which maintains identical linear speeds of travel for the two conveyors notwithstanding variations in the diameter of an extrusion being pulled through the apparatus.

As another aspect of the present invention the apparatus is adapted to instantaneously adjust to sudden variations in the diameter of an extrusion being pulled through the apparatus.

This feature is particularly advantageous in starting a plastic extruding operation. During the starting operation the first plastic extruded from the die is of relatively small diameter when it is inserted into the pulling apparatus. Hence it is necessary, at the outset, for the operator to adjust the extruding machine to produce the proper size and wall thickness for the flowing extrusion. Prior to the present invention it has been necessary to have one operator at the extruding machine and a second operator at the pulling apparatus, the duties of the second man being to vary the distance between the confronting surfaces of the endless conveyors that frictionally engage the extrusion to accommodate the variations in the diameter of the extrusion passing through the pulling apparatus. Since the apparatus of the present invention is adapted to instantaneously and automatically adjust for such variations in diameter, the need for a second man at the pulling apparatus is eliminated and it becomes possible for a single man to set up an extrusion operation.

It is therefore an object of the present invention to provide an improved apparatus for applying tension to extrusions which apparatus includes spaced endless conveyors provided with a novel interconnecting drive mechanism.

It is another object of the present invention to provide a novel apparatus of the type described that is adapted to instantaneously adjust to variations in the diameter of an extrusion being drawn through the apparatus.

Further objects and advantages of the present invention will be apparent from the following description, reference being had to the accompanying drawings wherein a preferred form of embodiment of the invention is clearly shown.

Figure 1:
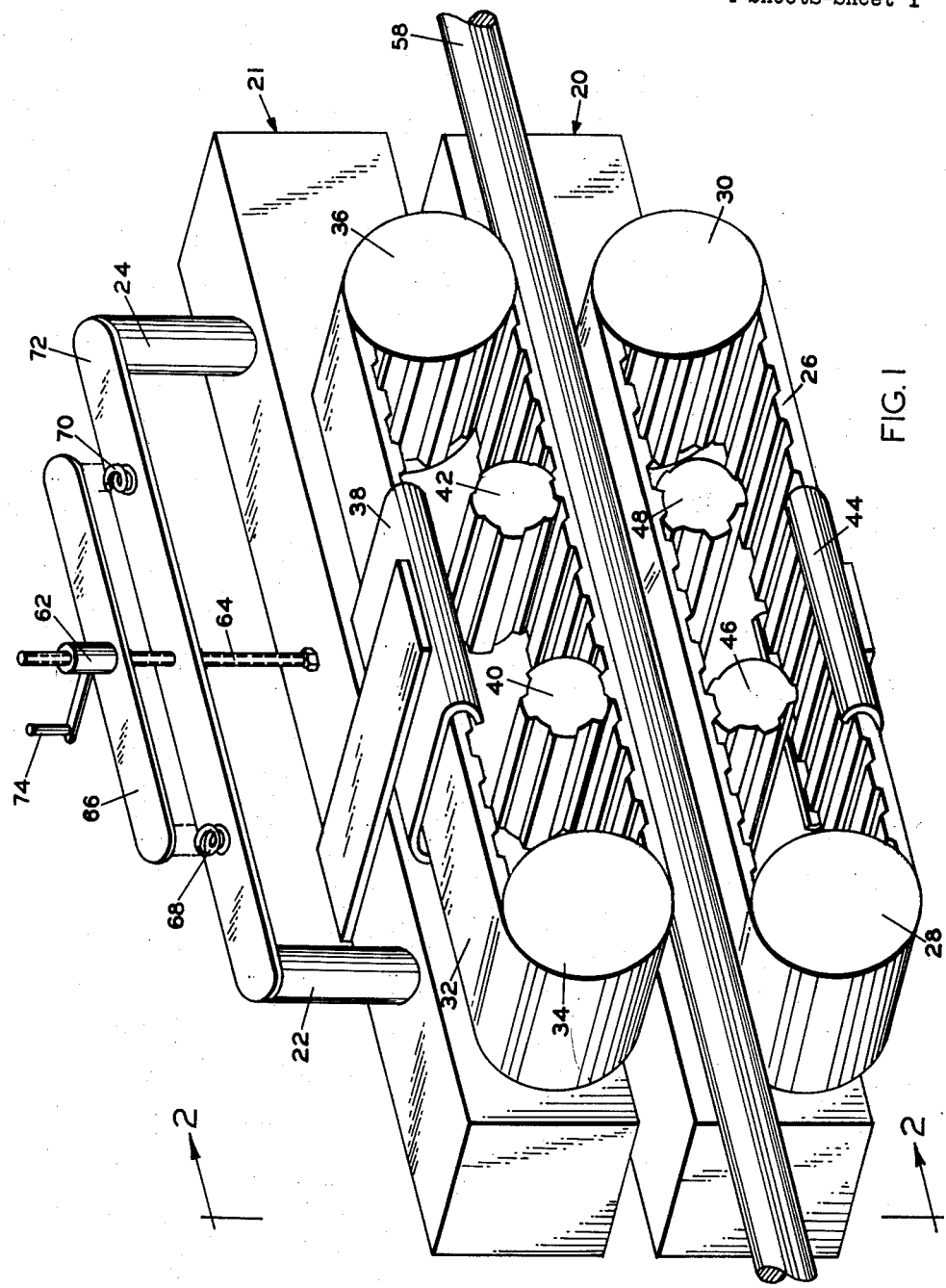
FIG. 1 is a perspective view of an apparatus for applying tension to extrusions, said apparatus being constructed in accordance with the present invention.

Referring in detail to the drawing, the apparatus of the present invention includes a stationary main frame portion 20 and a vertically movable frame portion indicated generally at 21, the latter being supported on a plurality of guide rods 22 and 24. A lower endless conveyor 26 is carried on a lower drive pulley 28 and a lower idler pulley 30.

An upper endless conveyor 32 is mounted on an upper drive pulley 34 and an upper idler pulley 36.

Upper frame portion 21 further includes a guide 38 and idlers 40 and 42. Lower frame portion 20 supports guide 44 and idlers 46 and 48.

Figure 2:
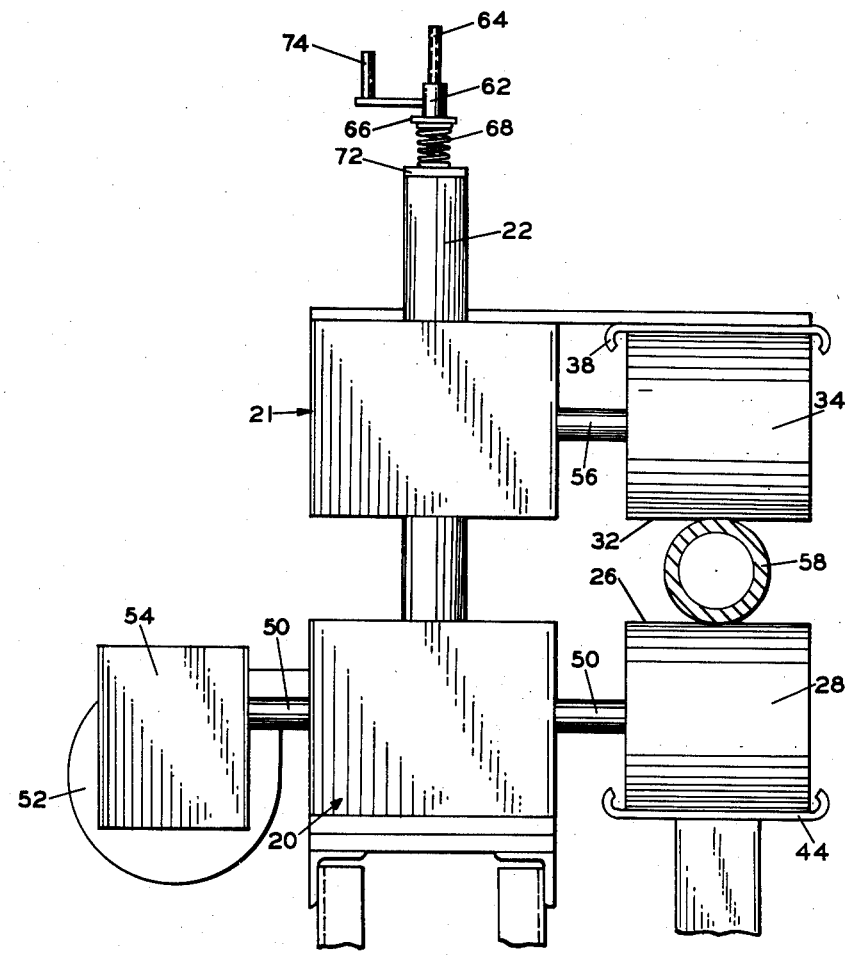
FIG. 2 is an end elevational view of the apparatus of FIG. 1.

With reference to FIG. 2, lower drive pulley 28 is keyed to a shaft 50 driven by a motor 52 and variable speed drive 54. Upper drive pulley 34 is keyed to a shaft 56 journaled in upper frame portion 21.

Upper frame portion 21 is normally urged downwardly towards lower frame portion 20, by the action of gravity, whereby endless conveyor 32 is caused to frictionally engage the upper side of an extrusion 58.

The downwardly directed force exerted by upper frame portion 21 is varied by manipulating a threaded element 62 carried on threaded rod 64, the latter having its lower end connected to upper frame portion 21 at a lock nut 110. Threaded element 62 is rotatably supported by a transverse member 66 which is in turn supported on springs 68 and 70. The lower ends of springs 68 and 70 rest on a transverse bracket 72 supported by the upper ends of guides 22 and 24.

When a handle 74 is rotated in one direction, springs 68 and 70 are compressed whereby the downwardly exerted force imposed on extrusion 58 is decreased. When handle 74 is rotated in the other direction springs 68 and 70 are released whereby a greater portion of the weight of upper frame portion 21 is imposed upon extrusion 58.

Figure 3:
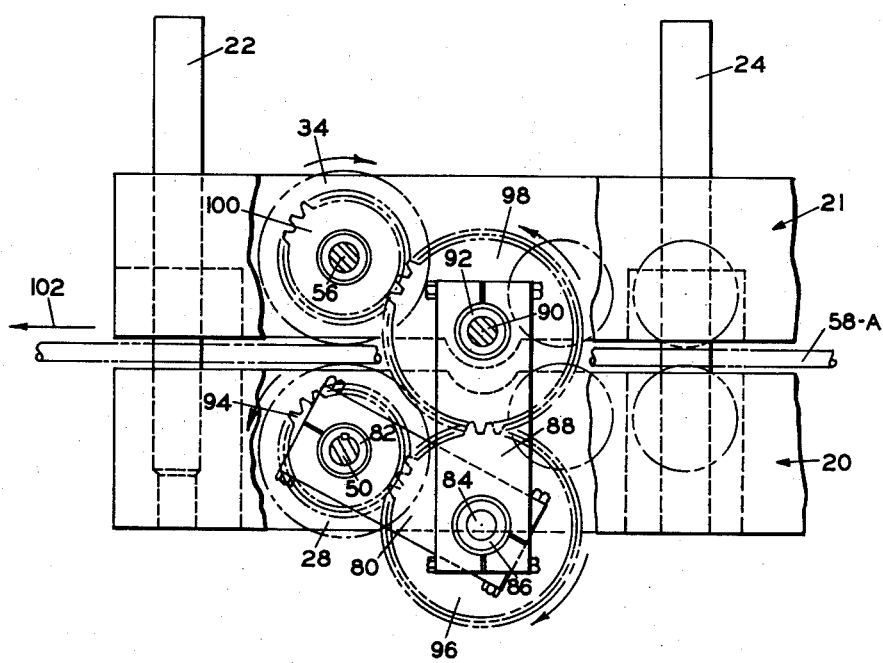
FIG. 3 is a side elevational view of a drive mechanism for the apparatus of the preceding figures.
Figure 4:
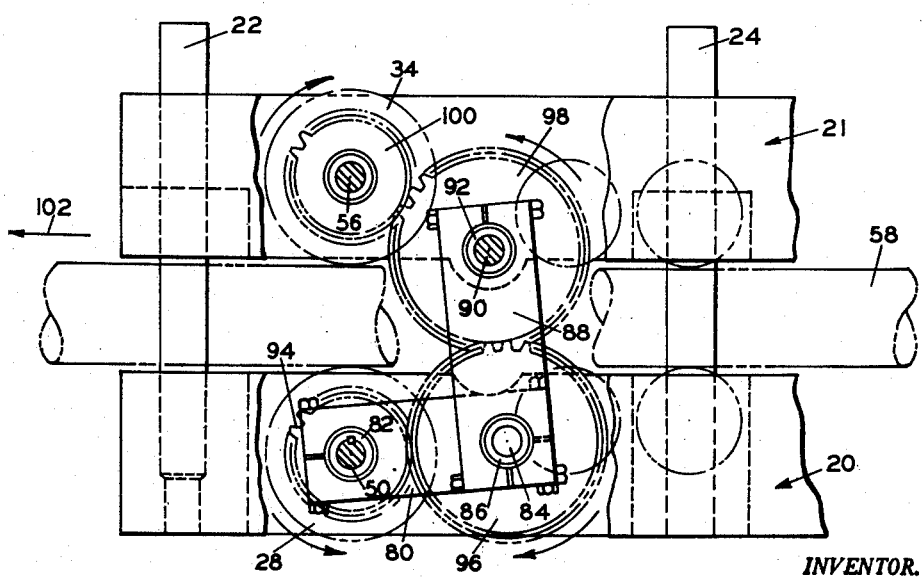
FIG. 4 is a second side elevational view of the drive mechanism of FIG. 3.
Figure 5:
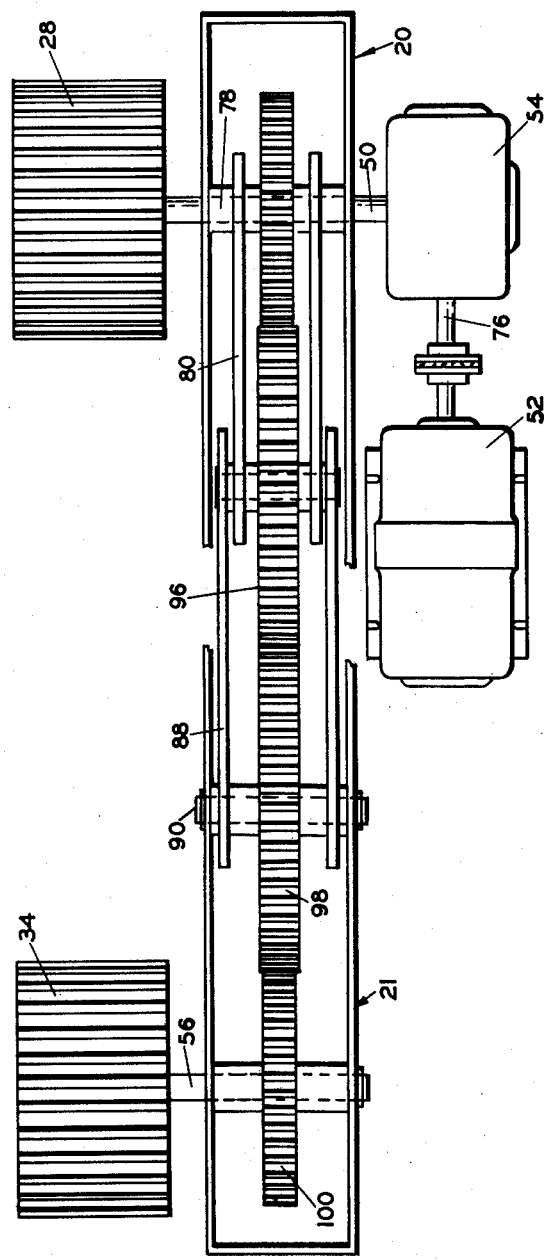
FIG. 5 is a schematic top view of the drive mechanism of FIGS. 3 and 4.

Reference is next made to FIGS. 3–5 which illustrate the drive mechanism for the previously mentioned drive pulleys 28 and 34.

As seen in FIG. 5, motor 52 drives variable speed drive 54 by means of shaft 76. Lower drive pulley 28 is keyed to shaft 50 journaled on lower frame portion indicated schematically at 20 at a bearing 78.

With reference to FIGS. 3 and 4, a link 80 is pivotally mounted to shaft 50 at a bearing 82 and carries a floating shaft 84 at a bearing 86. A second link 88 has its upper end pivotally mounted to a shaft 90 journaled in upper frame portion 21 and the lower end of link 88 is connected to shaft 84. A bearing 92 is provided between link 88 and shaft 90.

The shafts 50, 84, 90, and 56 respectively carry gears 94, 96, 98, and 100, said gears being in meshed driving relationship.

Gears 94 and 100 are of the same pitch diameter and gears 96 and 98 are of the same pitch diameter whereby upper drive pulley 34 is driven at the same speed as drive pulley.

FIG. 3 shows the configuration of the gears and links when an extrusion 58A of relatively small diameter is passing between the endless conveyors 26 and 32. FIG. 4 illustrates the configuration of the gears and links when a larger diameter extrusion 58 is passing through the endless conveyors 26 and 32.

It will be understood that when upper frame portion 21 moves upwardly on guides 22 and 24 then floating gear 96 moves upwardly with link 88 and the right end of link 80. When this occurs the distance between the centers of gears 94 and 96 and gears 98 and 100 are maintained constant by links 80 and 88 such that meshed engagement of the gears is at all times maintained.

With reference to FIGS. 3 and 4 when an extrusion 58 or 58A is being pulled through the machine in a direction indicated by arrow 102 the extrusion will exert a back-tension in a direction opposite to arrow 102. This causes the torque being applied to lower drive shaft 50 to urge the upper frame portion 21 upwardly and away from lower frame portion 20 and decrease the load being applied to extrusion 58 or 58A. This is due to the particular configuration of the gears and linkage. When, however, an extrusion 58 or 58A is being drawn through the apparatus in a direction opposite to that indicated by arrow 102 the back-tension exerted by extrusion 58 or 58A will cause the torque exerted by the mechanism to tend to urge the upper frame portion 21 downwardly relative to lower frame portion 20 and increase frictional grip exerted by the belts on the extrusion.

In view of the above it will be understood that when it is desired to increase frictional engagement with the extrusion when increased back-tension is encountered then drive shaft 50 is operated in a clockwise direction as viewed in FIGS. 3 and 4. When it is not desired to increase frictional engagement with the extrusion when increased back-tension is encountered then shaft 50 is driven in a counter-clockwise direction as indicated in FIG. 3, and the pulling apparatus is oriented to draw the extrusion in a direction opposite to that indicated by arrow 102.

It should be pointed out that FIG. 5 is merely a schematic showing of the gear and link arrangement with the upper drive pulley 34, gear 100, gear 98, gear 96, and link 88 being laid out in the same plane with lower drive pulley 28, lower gears 94 and 96, and lower link 80. In the actual apparatus the gears 98 and 100 are actually located above the gears 96 and 94 as is illustrated in FIGS. 3 and 4.

While the form of embodiment of the present invention as herein disclosed constitutes a preferred form, it is to be understood that other forms might be adopted, all coming within the scope of the claims which follow:

I claim:
1. An apparatus for applying tension to extrusions comprising, in combination, a first frame portion; a second frame portion; guide means on one of said frame portions and movably supporting the other of said frame portions; a first shaft journaled on said first frame portion; a second shaft journaled on said second frame portion; a first link including a first end pivoted on said first shaft and a second end; a second link including a first end pivoted on said second shaft and a second end; a third shaft journaled on said second ends of said first an second links; means forming a driving connection between said first and third shafts; means forming a driving connection between said third and second shafts; means forming a first endless drive surface mounted on said first frame portion and driven by said first shaft; a fourth shaft journaled on said second frame portion, means forming a second endless drive surface mounted on said second frame portion and driven by said fourth shaft, said drive surfaces being disposed in confronting relationship for frictionally engaging opposite sides of an extrusion, said frame portions being yieldably responsive to variations in the diameter of said extrusion; and means for driving certain of said shafts.

2. An apparatus for applying tension to extrusions comprising, in combination, a lower frame portion; an upper frame portion; guide means on one of said frame portions and movably supporting the other of said frame portions, said upper frame portion being yieldably urged towards said lower frame portion by the action of gravity; adjusting means for varying the effect of the action of gravity on said upper frame portion; a first shaft journaled on said lower frame portion; a second shaft journaled on said upper frame portion; a first link including a first end pivoted on said first shaft and a second end; a second link including a first end pivoted on said second shaft and a second end; a third shaft journaled on said second ends of said first and second links; means forming a driving connection between said first and third shafts; means forming a driving connection between said third and second shafts; a first endless belt mounted on said lower frame portion and driven by said first shaft; a fourth shaft journaled on said upper frame portion, a second endless belt mounted on said upper frame portion and driven by said fourth shaft, said belts being disposed in confronting relationship for frictionally engaging opposite sides of an extrusion; and means for driving certain of said shafts.

3. An apparatus for applying tension to extrusions comprising, in combination, a first frame portion; a second frame portion; guide means on one of said frame portions and movably supporting the other of said frame portions; a first shaft journaled on said first frame portion; a second shaft journaled on said second frame portion; a first link including a first end pivoted on said first shaft and a second end; a second link including a first end pivoted on said second shaft and a second end; a third shaft journaled on said second ends of said first and second links; a first gear on said first shaft; a second gear on said second shaft; a third gear on said third shaft and in meshed engagement with said first and second gears; a fourth shaft journaled on said second frame portion; means forming a driving connection between said second and fourth shafts; a first endless belt on said first shaft; a second endless belt on said fourth shaft, said belts being disposed in confronting relationship for frictionally engaging opposite sides of an extrusion, said frame portions being yieldable responsive to variations in the diameter of said extrusion; and means for driving certain of said shafts.

4. An apparatus for applying tension to extrusions comprising, in combination, a lower frame portion; an upper frame portion; a first guide means on one of said frame portions; a second guide means on the other of said frame portions and in vertical sliding engagement with the other of said frame portions, said upper frame portion being yieldably urged towards said lower frame portion by the action of gravity; adjusting means for varying the effect of the action gravity on said upper frame portion; a first shaft journaled on said lower frame portion; a second shaft journaled on said upper frame portion; a first link including a first end pivoted on said first shaft and a second end; a second link including a first end pivoted on said second shaft and a second end; a third shaft journaled on said second ends of said first and second links; means forming a driving connection between said first and third shafts; means forming a driving connection between said third and second shafts; a first endless belt on said first shaft; a fourth shaft journaled on said upper frame portion, a second endless belt on said fourth shaft, said belts being disposed in confronting relationship for frictionally engaging opposite sides of an extrusion; and means for driving certain of said shafts.

5. An apparatus for applying tension to extrusions comprising, in combination, a first frame portion; a second frame portion; a first shaft journaled on said first frame portion; a second shaft journaled on said second frame portion; means yieldably connecting said frame portions for relative movement responsive to variations in the diameter of said extrusions; means forming a first endless drive surface on said first shaft; means forming a second endless drive surface on said second shaft, said drive surface being disposed in confronting relationship; a torque transmitting link keyed to one of said shafts on one of said frame portions and connected to the other of said frame portions whereby a variation in the back tension on said extrusion varies the gripping force exerted by said drive surfaces on said extrusion; and means for driving certain of said shafts.

6. An apparatus for applying tension to extrusions comprising, in combination, a first frame portion; a second frame portion; a first shaft journaled on said first frame portion; a second shaft journaled on said second frame portion; means yieldably connecting said frame portions for relative movement responsive to variations in the diameter of said extrusions; means forming a first endless drive surface on said first shaft; means forming a second endless drive surface on said second shaft, said drive surface being disposed in confronting relationship; means for driving one of said shafts in one direction whereby the endless guide surface thereon moves in one direction at the zone of contact with said extrusion; a torque transmitting link keyed to said one shaft on one of said frame portions and including a link end extending from said one shaft in a direction opposite to said direction of movement of said guide surface; and means connecting said link end to the other of said frame portions whereby an increase in the back tension on said extrusion decreases the gripping force exerted by said drive surfaces on said extrusion.

7. An apparatus for applying tension to extrusions comprising, in combination, a first frame portion; a second frame portion; a first shaft journaled on said first frame portion; a second shaft journaled on said second frame portion; means yieldably connecting said frame portions for relative movement responsive to variations in the diameter of said extrusions; means forming a first endless drive surface on said first shaft; means forming a second endless drive surface on said second shaft, said drive surface being disposed in confronting relationship, means for driving one of said shafts in one direction whereby the endless guide surface thereon moves in one direction at the zone of contact with said extrusion; a torque transmitting link keyed to said one shaft on one of said frame portions and including a link end extending from said one shaft in the same direction as said direction of movement of said guide surface; and means connecting said link end to the other of said frame portions whereby a decrease in the back tension on said extrusion increases the gripping force exerted by said drive surfaces on said extrusion.

References Cited in the file of this patent

UNITED STATES PATENTS

| | | |
|---|---|---|
| 2,584,704 | Horn | Feb. 5, 1952 |
| 2,679,924 | Powell | June 1, 1954 |
| 2,961,138 | Kaye | Nov. 22, 1960 |

FOREIGN PATENTS

| | | |
|---|---|---|
| 1,083,065 | France | Jan. 5, 1955 |
| 1,117,058 | France | May 16, 1956 |